United States Patent [19]

Frame et al.

[11] Patent Number: 5,758,987
[45] Date of Patent: Jun. 2, 1998

[54] SNAP-IN FASTENER FOR FLUSH-MOUNTED PANELS

[75] Inventors: William R. Frame, Brookhaven, Pa.; Ralph C. Ulisse, Glassboro, N.J.; William A. Wiedmann, Southbend, Ind.

[73] Assignee: Southco, Inc., Concordville, Pa.

[21] Appl. No.: 707,535

[22] Filed: Sep. 4, 1996

Related U.S. Application Data

[63] Continuation-in-part of Ser. No. 529,746, Sep. 18, 1995, abandoned.

[51] Int. Cl.⁶ ............................................ F16B 13/00
[52] U.S. Cl. ................... 403/298; 403/326; 403/408.1; 24/297; 24/453
[58] Field of Search ........................ 403/298, 326, 403/327, 329, 397, 396, 385, 384, 405.1, 407.1, 408.1; 256/21, 22, 19, 59, 65, 24; 24/297, 453

[56] References Cited

U.S. PATENT DOCUMENTS

| | | |
|---|---|---|
| 3,651,545 | 3/1972 | Hara . |
| 3,811,154 | 5/1974 | Lindeman et al. . |
| 3,822,053 | 7/1974 | Daily ................................ 256/22 |
| 3,841,674 | 10/1974 | Bisbing et al. .................. 292/175 |
| 3,842,709 | 10/1974 | Fuqua ................................... 85/5 |
| 3,850,464 | 11/1974 | Bisbing et al. .................. 292/175 |
| 3,860,999 | 1/1975 | Meyer . |
| 3,939,752 | 2/1976 | Koscik ................................. 85/5 |
| 4,014,520 | 3/1977 | Walters ......................... 256/65 X |
| 4,159,592 | 7/1979 | Gabriel . |
| 4,477,058 | 10/1984 | Lowery ............................. 256/19 |
| 4,524,494 | 6/1985 | Sato et al. . |
| 4,540,160 | 9/1985 | Zanavich et al. ................ 256/19 |
| 4,644,614 | 2/1987 | Mizusawa . |
| 4,652,192 | 3/1987 | Schaller ............................ 411/24 |
| 4,681,288 | 7/1987 | Nakamura . |
| 4,691,897 | 9/1987 | Frush ............................. 256/256 |
| 4,723,760 | 2/1988 | O'Sullivan ...................... 256/22 |
| 4,784,550 | 11/1988 | Wollar ............................. 411/32 |
| 5,120,025 | 6/1992 | D'Avanzo ....................... 256/22 |
| 5,134,754 | 8/1992 | Vickers ........................... 16/124 |
| 5,150,885 | 9/1992 | Leone ............................. 256/22 |
| 5,158,329 | 10/1992 | Schlack .......................... 292/87 |
| 5,161,783 | 11/1992 | German ......................... 256/19 |
| 5,372,354 | 12/1994 | Cacicedo ........................ 256/22 |

FOREIGN PATENT DOCUMENTS

| | | |
|---|---|---|
| 288161 | 2/1964 | Australia . |
| 454253 | 5/1971 | Australia . |
| 639108 | 6/1990 | Australia . |
| 0519856 | 12/1992 | European Pat. Off. . |
| 2233884 | 1/1975 | France . |
| 1578381 | 11/1980 | United Kingdom . |
| 2111579 | 7/1983 | United Kingdom . |

OTHER PUBLICATIONS

Catalog Pages (Micro Plastics, Inc., Flippin, Arkansas) pp. 15, 17, 18 and 24. (1993).

*Primary Examiner*—Kenneth J. Dorner
*Assistant Examiner*—William L. Miller
*Attorney, Agent, or Firm*—Paul & Paul

[57] ABSTRACT

A fastener connects panel members in a flush position. The fastener includes a pair of connecting members which are snap-fit within apertures provided within each of the panel members for securing the panel members together. The fastener also disconnects the panel members when secured together. For this purpose, at least one of the connecting members is removable from the panel member aperture to disconnect the panel members. The fastener allows the panels to be assembled together and disassembled quickly and with little or no tooling.

10 Claims, 5 Drawing Sheets

5,758,987

1

SNAP-IN FASTENER FOR FLUSH-MOUNTED PANELS

CROSS-REFERENCE TO RELATED APPLICATIONS

This application is a continuation-in-part of U.S. application Ser. No. 08/529,746 filed Sep. 18, 1995, now abandoned.

FIELD OF THE INVENTION

The present invention is related to snap-in fasteners, and more particularly to fasteners for aligning and connecting flush-mounted panels such as picket fence posts and rails. The fasteners allow the panels to be assembled together and disassembled with little or no tooling.

BACKGROUND OF THE INVENTION

Various techniques have been used to connect picket fence panels. For example, U.S. Pat. Nos. 3,822,053, 4,540, 160, 4,723,760, 5,120,025, 5,150,885, 5,161,783 and 5,372, 354 disclose picket fence assemblies using several different means for connecting the vertical pickets to the horizontal rails. Such picket fence assemblies are increasingly being fabricated from plastics such as PVC due to the durability, appearance and low cost of such materials.

Flush-mounted picket fences are gaining widespread use, wherein an exterior surface of each horizontal rail is mounted against an exterior surface of each vertical picket. In this type of assembly, the rails and pickets are typically hollow and are connected by fasteners such as self-tapping screws or drive rivets. However, the use of such fasteners is relatively labor intensive and requires the use of tools for assembly. Moreover, such fasteners require holes to be drilled through the outwardly facing surfaces of the rails and/or pickets in order to allow access to the fasteners during assembly. These holes may be plugged by plastic caps and the like, but such caps represent additional costs in terms of component parts and assembly, and can detract from the appearance of the assembled fence.

In addition to picket fences, many other types of panels require flush-mount fasteners. For instance, in the automotive industry several different types of panel fasteners are used for attaching trim, emblems, upholstery, sheet metal parts and the like to support panels. Examples of such fasteners are disclosed in U.S. Pat. Nos. 3,842,709, 3,860, 999, 3,939,752 and 4,652,192. Flush-mount fasteners may also be useful in the appliance and modular furniture industries.

The present invention has been developed in view of the foregoing and to overcome other deficiencies of the prior art.

SUMMARY OF THE INVENTION

An object of the present invention is to provide a novel fastener for flush-mounted panels.

Another object of the present invention is to provide an improved fastener for assembling panels such as fence rails and pickets using little or no tooling.

Another object of the present invention is to provide a method for assembling panels such as picket fence components using a snap-in fastener which requires little or no tooling.

Another object of the present invention is to provide a fastener for both assembling and disassembling panels, such as a jack stowage cover which is repeatedly attached to and removed from a fixed panel.

2

DETAILED DESCRIPTION OF THE PREFERRED EMBODIMENTS

Figure 1:
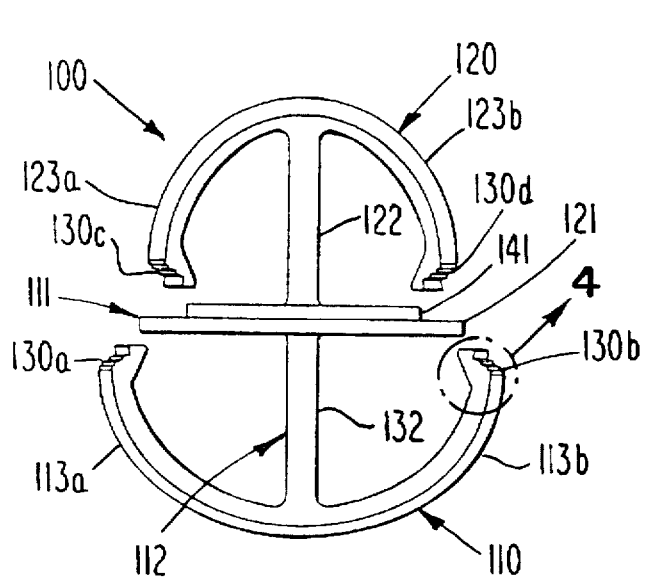
FIG. 1 is an elevational view of a fastener in accordance with an embodiment of the present invention.
Figure 2:
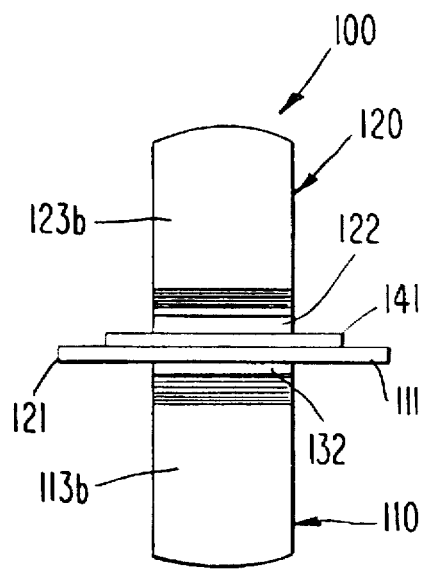
FIG. 2 is a side view of the fastener shown in FIG. 1.

Referring now to the drawings in detail, wherein like reference numerals indicate like elements throughout the several views, there is shown in FIG. 1 an elevational view of a fastener 100 in accordance with an embodiment of the present invention. The fastener 100 as illustrated includes, as portions thereof, a body 112, first and second connecting members 110 and 120, respectively, and a shoulder 121, which will be described in further detail in the following paragraphs.

The body 112, as seen in FIG. 1, is substantially elongated along its longitudinal axis and includes the connecting members 110 and 120 at its terminating ends. The shoulder 111 is connected with the body 112 and positioned between the connecting members 110 and 120. In this embodiment, the position of the shoulder 111 is substantially transverse the body 112 and separates the body 112 into the portions 122 and 132.

The connecting members 110 and 120 as best illustrated in FIG. 1 each define a pair of legs which are attached to the terminating ends of the body 112; specifically, the first connecting member 110 is defined by the legs 113A and 113B, and the second connecting member 120 is defined by the legs 123A and 123B. In this embodiment, each of the legs 113A,B and 123A,B are radiused which provides a substantially arch-shaped configuration of the first and second connecting members 110 and 120.

In addition, the connecting members 110 and 120 are flexible due to the resiliency of the legs 113A,B and 123A,B and accordingly are moveable relative to the position of the body 112. Further, as best seen in FIG. 1, the position of the terminating ends 130A-D of the legs 113A,B and 123A,B, which are opposite the connection with the body 112, are positioned proximate to the shoulder 111. In accordance with the present embodiment, the width of the first connecting member 110 between the terminating ends 130A,B of the legs 113A and 113B is greater than that of the second connecting member 120, which is defined by the width between the terminating ends 130C and D of the legs 123A and B.

Figure 4:
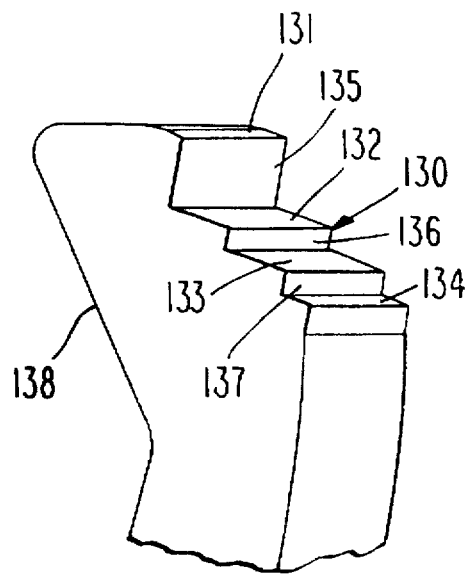
FIG. 4 is a detailed view showing a portion of the fastener of FIG. 1.

In FIG. 4 is illustrated a detailed view of the terminating end 130B of the leg 113B. As illustrated in FIG. 4, the leg 113B proximate its terminating end 130B is tapered inwardly along the surface 138 in the direction of the body 112. Opposite the surface 138 is provided a substantially stepped section defined by the surfaces 131-137. Although not shown in detail, the portions 130A, C and D are of the same configuration as that of the portion 130B.

Figure 3:
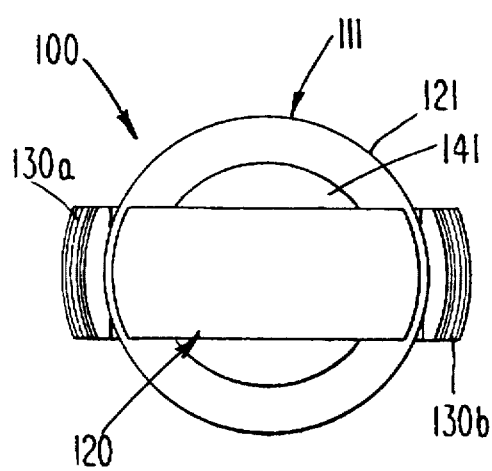
FIG. 3 is a top view of the fastener shown in FIG. 1.

The shoulder 111, as best seen in the top plan view of FIG. 3, is a substantially annular member defined by the pair of annular portions 121 and 141, with the portion 121 being positioned proximate the connecting member 110 and the portion 141 being positioned proximate the connecting member 120. In this embodiment, the radius of the portion 121 is greater than that of the portion 141.

In the present embodiment, the fastener 100 is preferably comprised of plastic, such as acetal, however, it should be understood that other suitable materials can also be used for this purpose.

Figure 5:
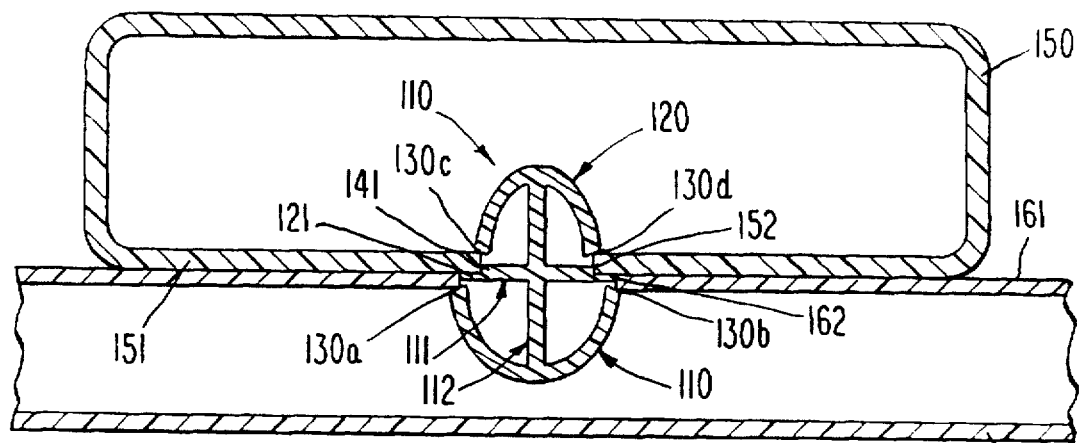
FIG. 5 is a side cross sectional view of the fastener of FIG. 1 installed in a vertical fence picket and horizontal rail.

The operation of the fastener 100 will now be described. The fastener 100 as illustrated in FIG. 5 is positioned securing together opposing panel members 140 and 150. In the present embodiment, the first and second panel members 140 and 150 comprise a vertical fence picket and horizontal rail, preferably manufactured of vinyl. However, it should be understood that the fastener 100 in accordance with the present invention can be used with other types of panel members as well. For example, the first and second panel members 140 and 150 can comprise doors, panels or similar that are manufactured from any suitable material. One example are modular furniture pieces. In the illustrated embodiment, the panel members 140 and 150 in FIG. 5 are secured by the fastener 100 in flush engagement with each other against the corresponding surfaces 151 and 161. Each of the panel members 140 and 150 are provided with substantially annular apertures therein for receiving the fastener 100 in the manner shown. As illustrated, the diameter of the aperture 162 through the surface 161 of the first panel member 140 is sized substantially corresponding to the diameter of the portion 121 of the shoulder 111. Similarly, the diameter of the aperture 152 through the surface 151 of the second panel member 150 is sized substantially corresponding to the diameter of the second portion 141 of the shoulder 111. In accordance with the present invention, upon assembly the first and second connecting members 110 and 120 are inserted into the apertures 152, 162 through the first and second panel members 140 and 150. As the first and second connecting members 110 and 120 are being inserted into the respective apertures, the legs 113A,B and 123A,B are flexed inward through the engagement with the panel surfaces 151 and 161. When the fastener 100 is installed in the position shown in FIG. 5, the legs 113A,B and 123A,B flex outward and snap into the apertures 152, 162 with the end portions 130A-D coming into contact with the edges of the surfaces 151 and 161. In the present embodiment, the second connecting member 120 is inserted first into the second panel member 150. As the second connecting member 120 is installed, the portion 141 of the shoulder 111 is received within the aperture 152 in the second panel member 150, and the portion 121 engages the surface 151. Thereafter, the first connecting member 110 is installed in the first panel member 140. Similarly, the portion 121 of the shoulder 111 is received within the aperture 162 through the first panel member 140. In this configuration, the first and second panel members 140 and 150 are provided in flush engagement to each other.

Figures 6, 7:
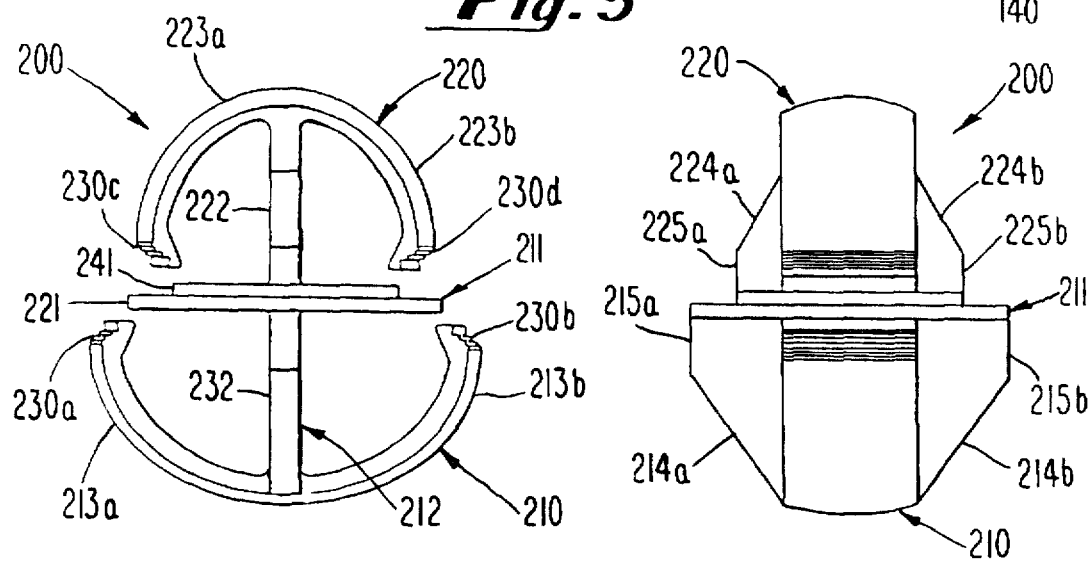
FIG. 6 is an elevational view of a fastener in accordance with another embodiment of the present invention.
FIG. 7 is a side view of the fastener shown in FIG. 6.
Figure 8:
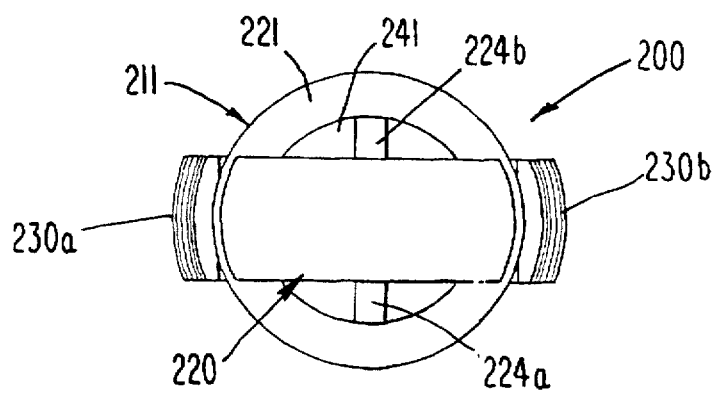
FIG. 8 is a top view of the fastener shown in FIG. 6.

In FIGS. 6-8 is illustrated a fastener 200 in accordance with another embodiment of the present invention. In the present embodiment, the portions corresponding to the portions described in relation to the fastener 100 are described using the same number designations except beginning with the number 200. In order to simplify the description herein, only the portions which are different from that in relation to the fastener 100 will now be described. The fastener 200 as illustrated includes an enlarged body 212 as compared with the body 112 earlier described. Specifically, as best shown in the side view of FIG. 7, the portion 232 of the body 212 is elongated in a direction transverse its longitudinal axis. The configuration of the portion 232 of the body 212 includes an area of substantially constant diameter extending from the portion 221 of the shoulder 211 by the surfaces 215A and B, and then taper inward in the direction of the first connecting member 210 by the surfaces 214A and B. Similarly, the configuration of the portion 222 of the body 212 includes an area of substantially constant diameter extending from the portion 241 of the shoulder 211 by opposing surfaces 225A and B, and tapers inward along the surfaces 224A and B in the direction of the second connecting member 220.

Although not shown, the fastener 200 is assembled in corresponding panel members in the same manner illustrated in relation to the fastener 100. An advantage provided by the fastener 200 is that the enlarged configuration of the body 212 provides for improved centering as the fastener 200 is installed within the apertures in the panel members. Furthermore, there is also provided increased shear strength due to the position of the body member 212 within the respective apertures.

Figure 9:
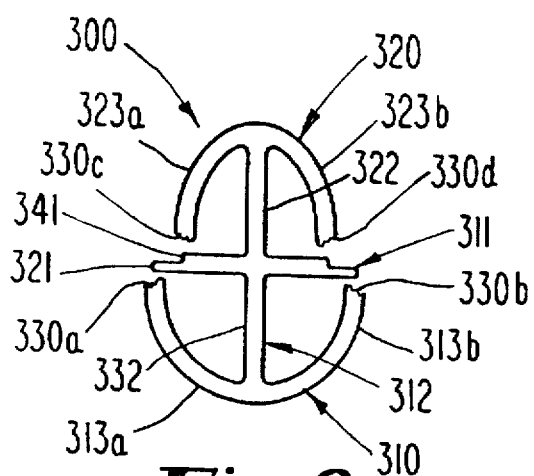
FIG. 9 is an elevational view of a fastener in accordance with another embodiment of the present invention.

In FIG. 9 is illustrated still a further embodiment of the fastener of the present invention. Similar to the fastener 200, the portions of the fastener in the present embodiment which correspond to the portions described in relation to the fastener 100 are described using the same number designations except beginning with the 300. Further, for the sake of brevity, only the portions which are different from that in relation to the fastener 100 will be described herein. As is illustrated, some minor differences are in the configuration of the ends 330A-D of the first and second connecting members 310 and 320. In particular, in this embodiment, each of the legs 113A,B and 123A,B are radiused along the entire length rather than bending slightly inward in the direction of the body 312 at its terminating ends, as is present in relation to the fastener 100 by surface 138. However, these differences in the configuration of the end portions 330A-D do not provide a differing function from that of the fastener 100. Another difference resides in the configuration of the shoulder 311. In the present embodiment, the shoulder 311 is substantially rectangular rather than being substantially angular in configuration, as is illustrated in the top plan view of FIG. 3 in relation to the shoulder 111. The main difference provided here due to the configuration of the rectangular shoulder 311 is that the portion 321 will only come into engagement with the panel member along its end portions. Further, another difference is that the fastener 300 can be mounted within a substantially rectangular aperture due to the configuration of the shoulder 311.

Figure 10:
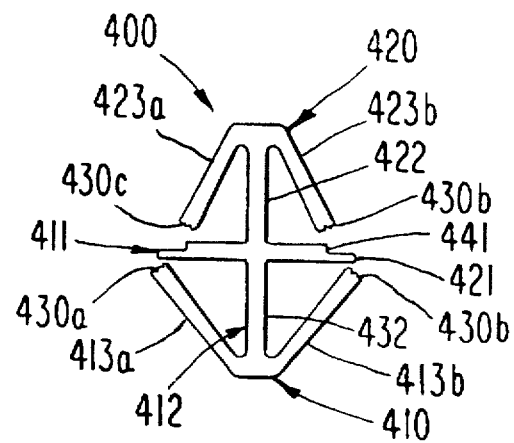
FIG. 10 is an elevational view of a fastener in accordance with a further embodiment of the present invention.

In FIG. 10 is illustrated still a further embodiment of the fastener according to the present invention. In this embodiment, similar to the earlier embodiments, the portions which correspond to the fastener 100 are described using the same number designations except beginning with the number 400. Also, only the portions which are different from that earlier recited will now be described. In the present embodiment, the configuration of the first and second connecting members 410 and 420 are substantially v-shaped rather than arch-shaped as with the fastener 100. Furthermore, the configuration of the shoulder 411 in this embodiment corresponds to the configuration of the shoulder 311 described above.

Figure 11:
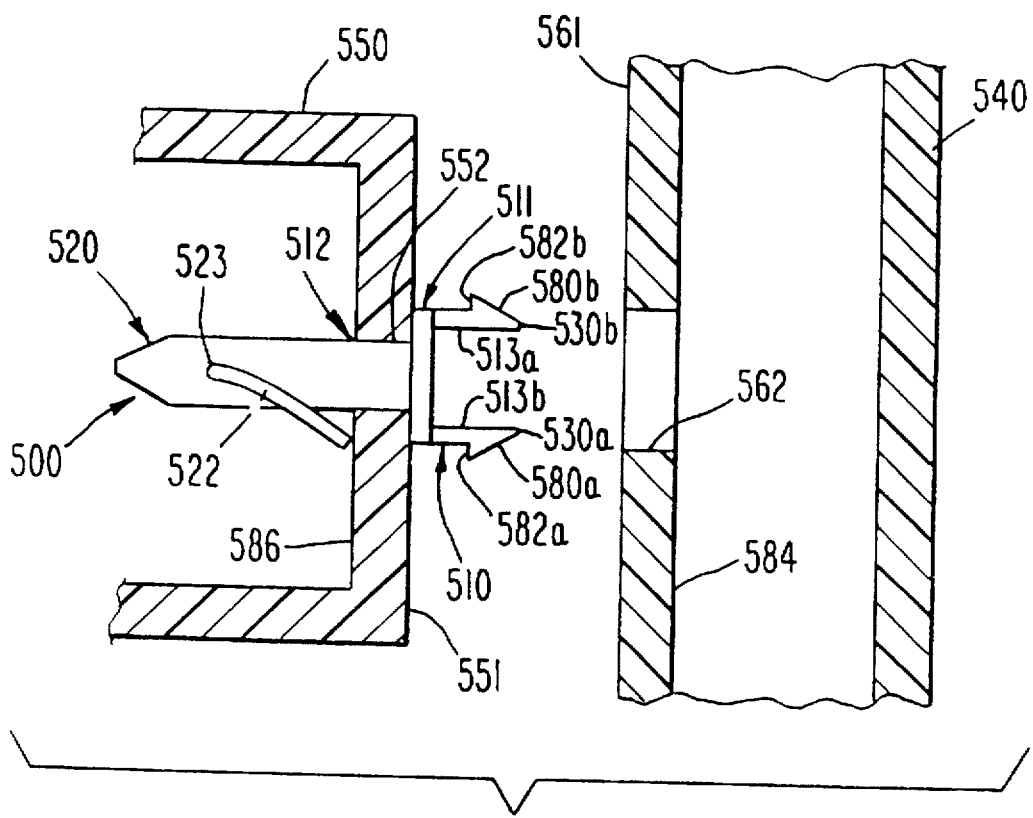
FIG. 11 is a side view of a fastener in accordance with another embodiment of the present invention as installed in a fence rail and adapted for insertion into a fence picket.
Figure 12:
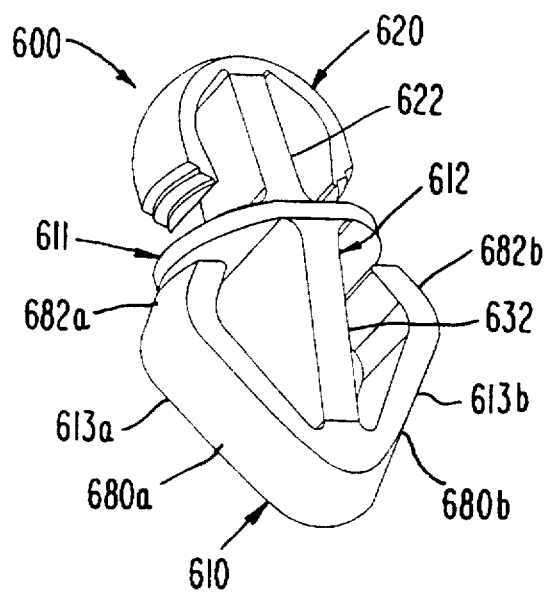
FIG. 12 is a perspective view of a fastener in accordance with another embodiment of the present invention.

FIG. 11 illustrates still another embodiment of the fastener of the present invention. In this embodiment, the fastener 500 is illustrated installed in a fence rail and is adapted for insertion into a fence picket. Consistent with the foregoing embodiments, the portions identified in this embodiment which correspond to the earlier embodiments will be described using the same number designations beginning with the number 500. The following will describe the differences in the present embodiment from that of the fastener 100. As illustrated in FIG. 11, the first connecting member 510 comprises a pair of legs 513A and 513B similar to the fastener 100. One difference in the fastener 500 is in the configuration of the legs 513A,B. In particular, the ends 530A,B include camming surfaces 580A,B and locking surfaces 582A,B. The camming surfaces 580A,B are adapted to engage the edges of the aperture 562 for flexing the legs 513A,B inward as the fastener 500 is being installed. When the fastener 500 has been installed within the aperture 562, the legs 513A,B again are flexed outward and the locking surfaces 582A,B engage the inside surface 584 of the picket 540 for retaining the fastener 500 in this latch position. Further, another difference in the fastener 500 is that the legs 513A,B are attached directly to the shoulder 511 rather than to the body as is illustrated in the fastener 100. The remaining portion of the fastener 500 is similar to a conventionally known fastener manufactured by the assignee of the present application under the name "Southco Spring Lock", Part Number T3-4229. Specifically, as is illustrated in FIG. 11, the body 512 extends from the shoulder 511 and terminates by the second connecting member 520. The second connecting member 520 includes a locking spring 522 extending on each side of the body 512 (only one side of which is visible) and is passed through an aperture 523. For mounting of the fastener 500 within the rail 550, a bow-tie shaped aperture 552 is provided within the surface 551 which receives the second connecting member 520. This is followed by a one half turn of the fastener 500 so that the locking spring 522 is brought into engagement with the inside surface 586 of the rail 550. Similar to that earlier described, when the fastener 500 is in its latched position, the picket 540 and rail 550 are in a flush position with the surfaces 561 and 551 in engagement with one another. Further, it should be understood that the fastener 500 can be used in applications other than with picket fences where mounting of panel members are desired.

Figure 13:
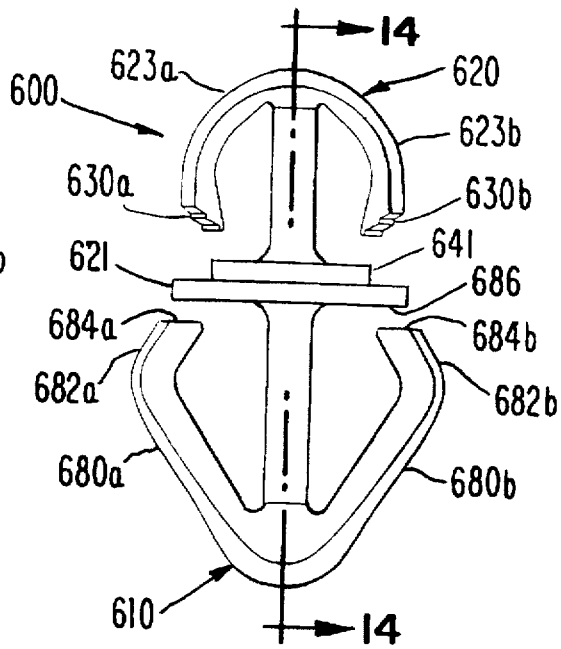
FIG. 13 is front elevational view of the fastener shown in FIG. 12.

In FIGS. 12-15 is illustrated a fastener 600 in accordance with another embodiment of the present invention. In the present embodiment, the portions corresponding to the portions described in relation to the fastener 100 are presented using the same number designations except beginning with the number 600, and in order to simplify the description herein, only those portions which are different from that in relation to the fastener 100 will be described. The primary difference of the fastener 600 from the fastener 100 is that the fastener 600, when assembled in corresponding panel members to secure the panel members together, such as is illustrated in relation to the fastener 100, is also adapted to be removed from the corresponding panel members in order to allow the panel members to be disassembled. For this purpose, the fastener 600 in the present embodiment includes a first connecting member 610 defined by a pair of legs 613a and 613b. In accordance with the present embodiment, each of the legs 613a and 613b are defined by at least first and second portions 680a, 680b and 682a, 682b, respectively. In the present embodiment, preferably each of the first portions 680a and 680b are attached with and extend in a direction generally away from the body 612, defining a substantially V-shaped configuration. In addition, in this embodiment preferably the second portions 682a and 682b are positioned at the terminating ends of the legs 613a and 613b and extend from the respective first portions 680a and 680b in a direction generally toward the body 612. In this manner, the configuration of the first and second portions 680a with 682a and 680b with 682b of each of the legs 613a and 613b are generally V-shaped in this embodiment. As best seen in FIG. 13, the second portions 682a and 682b have terminating ends 684a and 684b which are substantially planar and parallel with a bottom surface 686 of the portion 621 of the shoulder 611.

Figure 14:
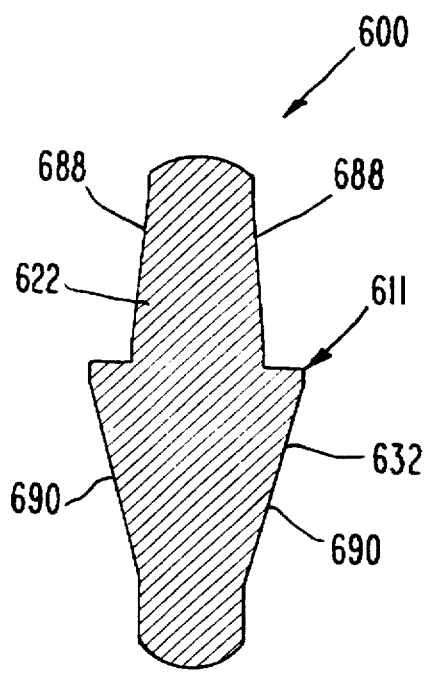
FIG. 14 is a side sectional view of the fastener shown in FIG. 12 taken along the line 14—14 of FIG. 13.

As best seen in the side sectional view of FIG. 14, the configuration of the portions 622 and 632 of the body 612 are similar to that in relation to the fastener 200. In particular, the portion 622 includes front and back walls 688 which taper outwardly from the connection with the second connecting member 620 to the shoulder 611. Similarly, the portion 632 includes front and back surfaces 690 which taper outwardly from the connection with the first connecting member 610 to the shoulder 611.

Figure 15:
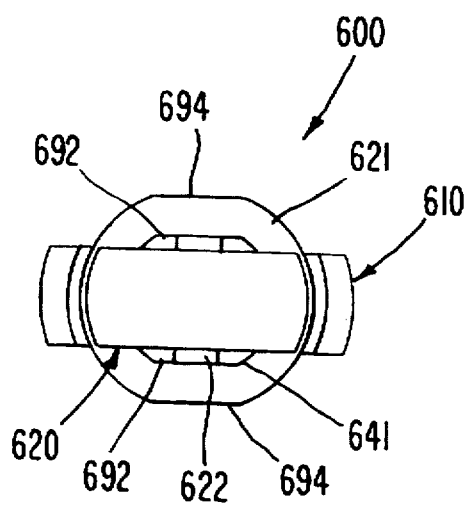
FIG. 15 is a top plan view of the fastener shown in FIG. 12.

As shown in the top plan view of FIG. 15, another difference in the fastener 600 from that of the fastener 100 is in the configuration of the shoulder 611. In the present embodiment, each of the portions 621 and 641 of the shoulder 611 are generally annular, with the portion 621 including substantially flat back and front surfaces 692 and the portion 641 including substantially flat front and back surfaces 694.

In operation of the fastener 600 in relation to the first and second panel members 140 and 150 in FIG. 5, the legs 613a and 613b snap into the aperture 162, with the second portions 682a and 682b coming into contact with the edges of the surface 161 proximate the aperture 162. In particular, as the legs 613a and 613b are installed in the aperture 162, the legs 613a and 613b initially flex inward due to the outward taper of the first portions 680a and 680b. Thereafter, as the first portions 680a and 680b are moved past the aperture 162, the legs 613a and 613b flex outward due to the inward taper of the second portions 682a and 682b and snap into the aperture 162, with the outer surfaces of the second portions 682a and 682b then coming into engagement with the edges of the aperture 162. Mounting of the second connecting member 620 in the aperture 152 is the same as that in relation to the second connecting member 120 of the fastener 100.

In accordance with the present embodiment, the fastener 600 can also be removed in order to disconnect or disassemble the panel members 140 and 150. In the present embodiment, the first connecting member 610 can be removed by being snapped out from the secured position within the aperture 162 of the panel member 140. In operation, preferably the first connecting member 610 is removed from the aperture 162 by either pulling or pushing the panel member 150, which initially flexes the legs 613a and 613b inward due to the outward taper of the second portions 682a and 682b. Thereafter, the legs 613a and 613b flex outward as the first portions 680a and 680b are moved out of the aperture 162. In addition, the first connecting member 610 can be removed by pulling or pushing the panel member 140 or pulling or pushing the fastener 600 itself.

An advantage provided by the fastener 600 is that the fastener can be both installed to secure two panels together as well as removed so that the panels can be disassembled. In the present embodiment, the first connecting member 610 is removable from the panel aperture while the second connecting member 620 is permanently secured in the panel aperture. For example, the second connecting member 620 can be permanently snapped into a first panel member, such as a jack stowage cover, and the first connecting member 610 can be both snapped in and out of a second panel member, such as a fixed panel, by pulling or pushing on the jack stowage cover. In addition, the body 612 provides for improved centering as the fastener 600 is installed within the apertures in the panel members, similar to that in relation to the fastener 200.

Figure 16:
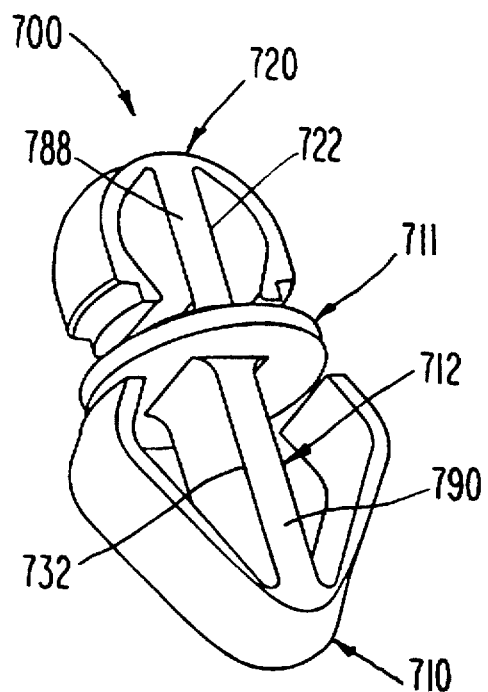
FIG. 16 is a perspective view of a fastener in accordance with another embodiment of the present invention.
Figure 17:
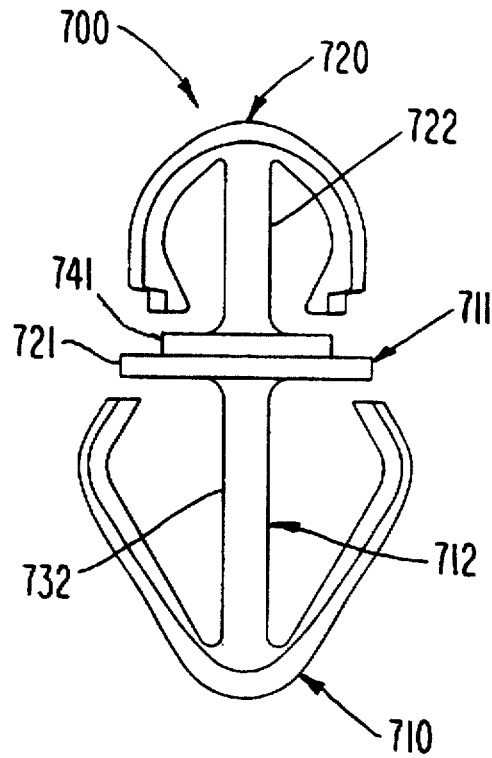
FIG. 17 is a front elevational view of the fastener shown in FIG. 16.
Figure 18:
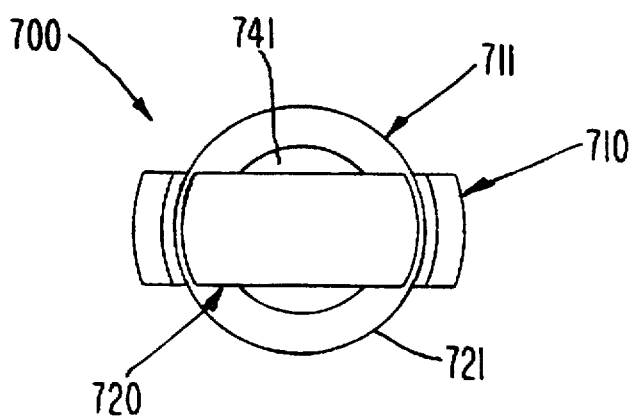
FIG. 18 is a top plan view of the fastener shown in FIG. 16.

In FIGS. 16–18 is illustrated a fastener 700 in accordance with another embodiment of the present invention. In the present embodiment, for the sake of brevity, only the portions which are different from that described in relation to the fastener 600 will be described herein, and corresponding portions will be described using the same number designations except beginning with the number 700. As is illustrated, the configuration of the shoulder 711 and body 712 of the fastener 700 are slightly different than that in relation to the fastener 600. As best seen in the top plan view of FIG. 18, the shoulder 711 defined by the portions 721 and 741 is substantially annular over its entire surface. Further, the body 712 which is defined by the portions 722 and 732, include substantially flat front and back surfaces 788 and 790, respectively (only the front surfaces are shown), which is similar to that illustrated in relation to the fastener 100. The remaining structure and operation of the fastener 700 is the same as that of fastener 600 and will not be further described for this reason.

Although not shown, it should be understood that other variations and embodiments of the present invention are also possible. One modification would allow the fastener to be installed in panels with the same size apertures formed therein. For purpose of this illustration, reference will be made to the fastener 100, however, it should be understood that this particular modification can also have application with the other embodiments as well. In the present embodiment, the shoulder 111 is modified to provide a third portion similar to and opposite the portion 141 and connected with the portion 121. Further, the configuration of the first connecting member 110 is changed in order to correspond to the size and configuration of the second connecting member 120. Due to this difference in structure, another difference in the present embodiment from that earlier described is that a small gap would be present between the panels when installed rather than in flush engagement.

Further, another modification is that the number of legs comprising the first or second connecting members in either of the foregoing embodiments can be varied to comprise more or less than two legs as is described above. For example, in any one of the foregoing embodiments the first connecting member can include three legs and the second connecting member can include four legs. Similarly, other combinations are also possible. In addition, the width of the spring legs can also be varied to be either larger or smaller than that illustrated above. Further, the size of the entire fastener can be manufactured in smaller and larger sizes in order to accommodate different space and strength requirements.

Based on the foregoing description of the various embodiments of the present invention, it should be understood that there are several advantages provided. One particular advantage is that the fastener will snap into both of the panel members into which it is installed which provides for a quick joining of the panel members. Further, there are no additional holes required for installation which would need to be covered by hole plugs or similar. Further, the fastener can be adapted for applications where flush joining of the panel members is desired and can accommodate a range of panel thicknesses.

In addition, the fastener can also be modified to snap out of one or both of the panel members into which it is installed, which provides for a quick disassembly of the panel members.

It is understood that the above description of the present invention is susceptible to considerable modifications, changes and adaptations by those skilled in the art, and that such modifications, changes and adaptations are intended to be considered within the scope of the present invention, which is set forth by the appended claims. For instance, it should be understood that the features disclosed in relation to anyone of the embodiments of the present invention described above can also have application in the remaining embodiments as well. For example, the connecting member 110 as shown in FIG. 1 can be substituted for the connecting member 510 shown in FIG. 11. In addition, the removable connecting member 610 can be substituted for any one of the connecting members shown in FIGS. 1–18, for example, the connecting member 620 can be substituted for the connecting member 610 so that each of the connecting members correspond to the connecting member 610. Furthermore, it should be understood that each of the particular features disclosed in relation to any one embodiment of the present invention all do not need to be present in that particular embodiment in order to be considered within the scope and spirit of the present invention.

We claim:

1. In combination, a fastener and first and second panel members, each of said panel members including apertures for receiving said fastener for securing the panel members in a fastened position, said combination comprising:

a generally elongated body;

a shoulder attached with said body having at least first and second portions, said first portion being received substantially within the aperture of the first panel member and the second portion being received substantially within the aperture of the second panel member; and first and second connecting means attached with said body for securing the fastener in the aperture of the first and second panel members, wherein at least the first connecting means comprises at least two generally flexible legs snap-fit within said aperture of said first panel member, with the second connecting means being received within the aperture of the second panel member, wherein each of said at least two generally flexible legs define a generally elongate member attached at a first end to said body and having a terminating end, with said terminating end being closer than said first end to said shoulder.

2. The combination according to claim 1 wherein said terminating end of each of said at least two generally flexible legs defines an unattached free end for movement relative to said body during mounting of said fastener.

3. The combination according to claim 2 wherein said terminating end of each of said at least two generally flexible legs is at spaced separation from said shoulder and said body.

4. The combination according to claim 3 wherein said body includes opposing terminating ends with at least said first connecting means attached with one of said terminating ends by said first ends of said at least two generally flexible legs, said at least two generally flexible legs generally diverging from the connection with said body in a direction of said shoulder.

5. The combination according to claim 4 wherein said shoulder bisects said body between said terminating ends.

6. The combination according to claim 5 wherein said first portion of said shoulder is of a defined diameter and said second portion of said shoulder is of a diameter greater than said first portion, wherein said first panel member engages said second portion of said shoulder when flush mounting of said first panel member against said second panel member.

7. The combination according to claim 1 wherein said second connecting means comprises at least two generally flexible legs, with each of said at least two generally flexible legs defining a generally elongate member attached at a first end to said body and having a terminating end, with said terminating end being closer than said first end to said shoulder and said terminating end defining an unattached free end.

8. The combination according to claim 1 wherein at least said first connecting means further comprises removing means for snapping out said at least two generally flexible legs from said aperture of said first panel member through only application of at least one of a suitable pulling or pushing force upon at least one of said first panel member, said second panel member or said fastener.

9. A method of installing a fastener for securing first and second panel members, each of the panel members including an aperture therein for receiving the fastener, the method including the steps of:

providing the fastener comprising:
a body generally elongated along a longitudinal axis and having opposing terminating ends;
a shoulder attached with and substantially transverse said longitudinal axis of said body, said shoulder having at least first and second portions;
first and second connecting means attached with said body for securing the fastener in the aperture of the first and second panel members, wherein at least the first connecting means comprises at least two generally flexible legs, with each of said at least two generally flexible legs defining a generally elongate member attached at a first end to said body and having a terminating end, with said terminating end being closer than said first end to said shoulder;

inserting said flexible legs of said first connecting means into said aperture of said first panel member;

securing said first connecting means in said first panel member aperture so that said second portion of said shoulder is positioned substantially within said aperture of said first panel member;

inserting said second connecting means into said aperture in said second panel member; and securing said second connecting means within said second panel member so that said first portion of said shoulder is positioned substantially within said aperture of said second panel member.

10. The method according to claim 9 further including the steps of:

providing said second connecting means comprising at least two generally flexible legs; and removing said second connecting means when secured within said second panel member as said flexible legs of said second connecting means are snapped out of said second panel member aperture.

* * * * *